US006557874B2

(12) United States Patent
Fader

(10) Patent No.: US 6,557,874 B2
(45) Date of Patent: May 6, 2003

(54) BUSHING RETAINER FOR STABILIZER BAR

(75) Inventor: Joseph A. Fader, Brighton, MI (US)

(73) Assignee: Meritor Suspension Systems Company, Troy, MI (US)

( * ) Notice: Subject to any disclaimer, the term of this patent is extended or adjusted under 35 U.S.C. 154(b) by 0 days.

(21) Appl. No.: 09/846,079

(22) Filed: May 1, 2001

(65) Prior Publication Data

US 2002/0163152 A1 Nov. 7, 2002

(51) Int. Cl.[7] ............................................. B60G 21/055
(52) U.S. Cl. ..................... 280/124.107; 280/124.167; 267/293
(58) Field of Search ................... 280/124.107, 124.166, 280/124.167, 124.169; 267/189, 276, 293, 141.2, 141.3, 141.7; 403/220, 222, 225, 226

(56) References Cited

U.S. PATENT DOCUMENTS

| | | | | |
|---|---|---|---|---|
| 4,143,887 A | * | 3/1979 | Williams et al. | ....... 280/124.106 |
| 4,192,529 A | * | 3/1980 | Shiratori et al. | ............ 267/276 |
| 5,112,031 A | * | 5/1992 | Hynds et al. | ......... 248/222.12 |
| 5,118,070 A | * | 6/1992 | Reid | ......................... 248/635 |
| 5,224,790 A | * | 7/1993 | Hein | ......................... 403/225 |
| 5,290,018 A | * | 3/1994 | Watanabe et al. | ........... 267/293 |
| 5,954,350 A | * | 9/1999 | Santo et al. | .......... 280/124.107 |

FOREIGN PATENT DOCUMENTS

| | | | |
|---|---|---|---|
| JP | 5-270240 | * | 10/1993 |
| JP | 2001-270315 | * | 10/2001 |
| JP | 2002-2249 | * | 1/2002 |

* cited by examiner

*Primary Examiner*—Paul N. Dickson
*Assistant Examiner*—David R. Dunn
(74) *Attorney, Agent, or Firm*—Carlson, Gaskey & Olds

(57) ABSTRACT

A suspension assembly is provided for use in stabilizing a vehicle during turning maneuvers. The suspension assembly includes a frame and the stabilizer bar secured to the frame by a bracket. A bushing having a hole along an axis receives the stabilizer bar. The bushing has a first portion disposed between the bracket and the stabilizer bar with the stabilizer bar supported by the first portion in a slip-fit relationship. A second portion extends from the first portion along the axis with a tether portion connecting the first and second portions. A notch is arranged adjacent to the tether portion and separates the first and second portions. Preferably, the notch and tether portion provide a frangible connection between the first and second portions. A clamp is supported on the second portion to secure the second portion to the stabilizer bar thereby preventing relative rotation between the second portion and the stabilizer bar. In this manner, the stabilizer bar is prevented from moving laterally relative to the frame. The bushing is preferably installed onto the stabilizer bar as a unit. The stabilizer bar is secured to the frame with the bracket arranged over the first portion of the bushing assembly.

24 Claims, 2 Drawing Sheets

BUSHING RETAINER FOR STABILIZER BAR

BACKGROUND OF THE INVENTION

This invention relates to a stabilizer bushing assembly, and more particularly, the invention relates to a stabilizer bushing assembly for laterally locating the stabilizer bar. Stabilizer bars are used to provide suspension stiffness to the vehicle during turning maneuvers.

As the vehicle turns and shifts to one side the stabilizer bar is deflected to provide increased stiffness. The stabilizer bar is typically connected to a vehicle frame by brackets. Stabilizer bushing assemblies are disposed within the brackets between the stabilizer bar and the bracket to permit rotation of the stabilizer bar during turning maneuvers. There is a tendency for the stabilizer bar to shift laterally during turning maneuvers. To this end, clamps have been used adjacent to the bushings to laterally locate the stabilizer bar relative to the vehicle frame.

Typically the clamps are attached directly to the stabilizer bar. The steel-to-steel contact between the clamp and the stabilizer bar creates undesirable corrosive effects. Moreover, the separate bushing and clamp increases the cost of assembling the stabilizer bar to the vehicle because multiple components must be installed onto the stabilizer bar and vehicle. Therefore, what is needed is an improved stabilizer bushing assembly that reduces the number of components that must be individually installed onto the stabilizer bar while eliminating steel-to-steel contact.

SUMMARY OF THE INVENTION AND ADVANTAGES

The present invention provides a suspension assembly for use in stabilizing a vehicle during turning maneuvers. The suspension assembly includes a frame and a stabilizer bar secured to the frame by a bracket. A bushing having a hole along an axis receives the stabilizer bar. The bushing has a first portion disposed between the bracket and the stabilizer bar with the stabilizer bar supported by the first portion in a slip-fit relationship. A second portion extends from the first portion along the axis with a tether portion connecting the first and second portions. A notch is arranged adjacent to the tether portion and separates the first and second portions. Preferably, the notch and tether portion provide a frangible connection between the first and second portions. A clamp is supported on the second portion to secure the second portion to the stabilizer bar thereby preventing relative rotation between the second portion and the stabilizer bar. In this manner, the stabilizer bar is prevented from moving laterally relative to the frame. The bushing is preferably installed onto the stabilizer bar as a unit. The stabilizer bar is secured to the frame with the bracket arranged over the first portion of the bushing assembly.

Accordingly, the above invention provides an improved stabilizer bushing assembly that reduces the number of components that must be individually installed onto the stabilizer bar while eliminating steel-to-steel contact.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
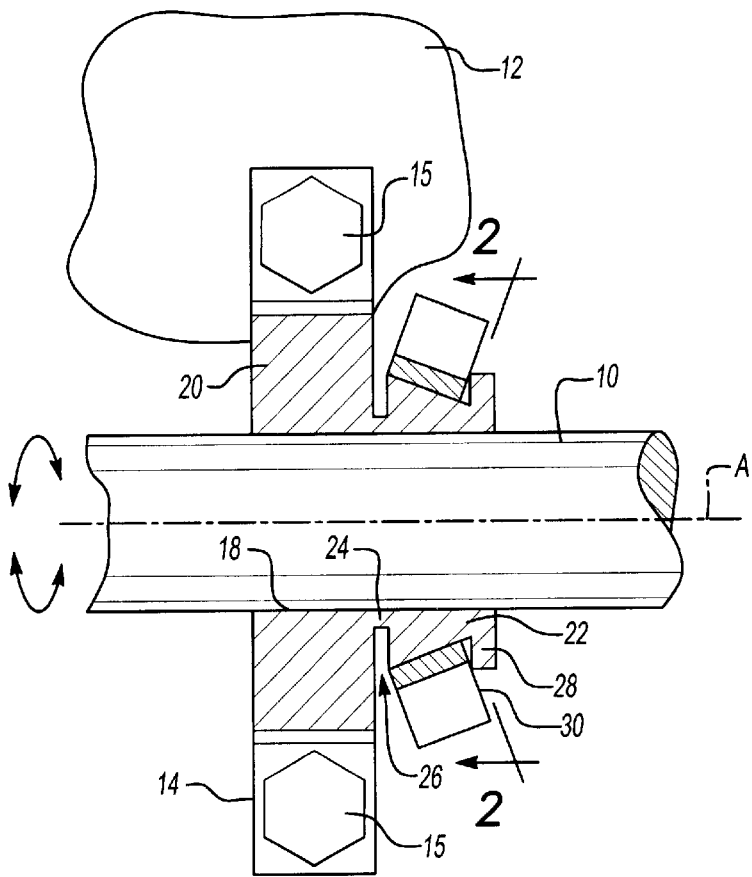
FIG. 1 is a top cross-sectional view of the bushing assembly of the present invention taken along line 2—2 of FIG. 2.
Figure 2:
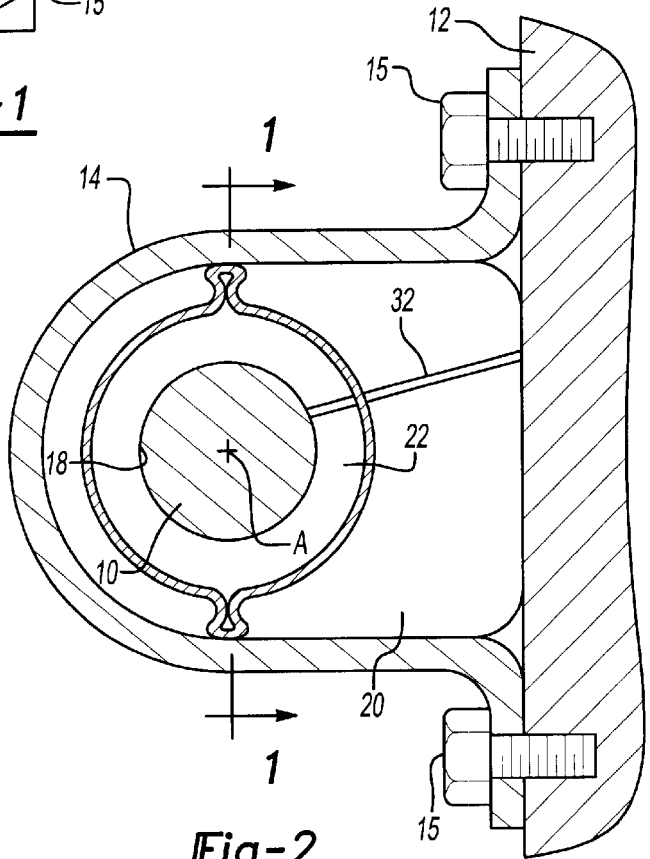
FIG. 2 is a side cross-sectional view of the bushing assembly shown in FIG. 1 taken along lines 1—1 of FIG. 1.

A stabilizer 10 is shown secured to a frame 12 in FIGS. 1 and 2. The stabilizer 10 is connected to the frame 12 by a U-shaped bracket 14, which is secured to the frame 12 by fasteners 15. A bushing assembly 16 having a hole 18 receiving the stabilizer bar 10 is supported within the bracket 14. The stabilizer 10 rotates about an axis A within the bushing assembly 16 during turning maneuvers as the stabilizer bar 10 deflects.

The bushing assembly 16 includes a first portion 20 disposed within the U-shaped opening in the bracket 14. Preferably, the exterior of the first portion 20 is of a complimentary shape to the U-shaped bracket to prevent relative rotation between the first portion 20 and the bracket 14. A second portion 22 extends from the first portion 20 along the axis A. A tether portion 24 connects the first 20 and second 22 portions together so that the bushing assembly 16 may be assembled onto the stabilizer bar 10 as a unit. Preferably, the bushing is unitarily constructed from an elastomeric material, such as a suitable rubber. A notch between the first 20 and second 22 portions is arranged adjacent to the tether portion 24. The tether portion 24 may be annular shaped. The notch 26 may be formed during the molding process or may be cut with a cutting tool. In the preferred embodiment, the tether portion 24 and notch 26 form a frangible connection between the first 20 and second 22 portions that may be broken during assembly or during operation of the vehicle.

A clamp 30, such as those commercially available through Oetiker, may be supported on the second portion 22. The second portion 22 may include a lip 28 for retaining the clamp 30 on the second portion 22 during assembly and vehicle use. As shown in FIG. 1, the second portion may taper downwardly toward the lip 28. However, it is to be understood that the second portion 22 instead may be cylindrical in shape with or without the lip 28. The bushing assembly 16 may include a slit 32 extending through the first 20 and second 22 portions, and the tether portion 24, to permit the bushing assembly 16 to be more easily installed onto the stabilizer bar 10.

In operation the bushing assembly 16, which preferably includes the clamp 30 being supported on the second portion 22, is installed onto the stabilizer bar 10. The bushing assembly 16 may be opened about the slit 32 so that the bushing assembly 16 may be located onto a desired portion of the stabilizer bar 10 by pushing the bushing over the bar or sliding past the curves in the stabilizer bar. The first portion 20 of the bushing assembly 16 is received within the bracket 14. The bracket 14 is secured to the frame 12, preferably by fasteners 15. The stabilizer bar 10 is permitted to rotate relative to the first portion 20. That is, the stabilizer bar 10 is received in a slip-fit relationship within the first portion 20. The clamp 30, which is preferably a metal ring, may be plastically deformed about the second portion 22 to secure the second portion 22 to the stabilizer bar 10. The second portion 22 and the stabilizer bar 10 are not intended to rotate relative to one another. With the first portion 20 securely received within the bracket 14 and the second portion 22 securely attached to the stabilizer bar 10, the stabilizer bar 10 is not intended to move laterally relative to the frame 12 during vehicle maneuvers. During vehicle maneuvers the stabilizer bar 10 rotates about the axis A. Since the first portion 20 is not permitted to rotate relative to the frame 20, the first 20 has a high restriction to rotation and second 22 portions may tear away from one another at the tether portion 24.

Figure 3A:
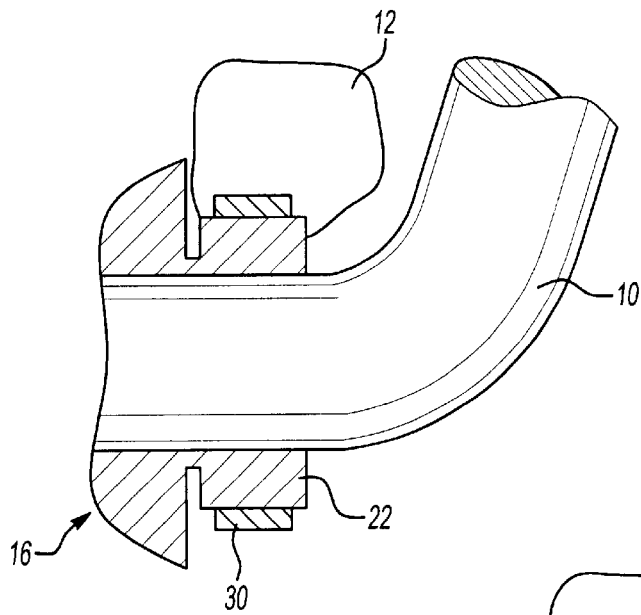
FIG. 3A is a side cross-sectional view of a stabilizer for use with the bushing assembly of the present invention.
Figure 3B:
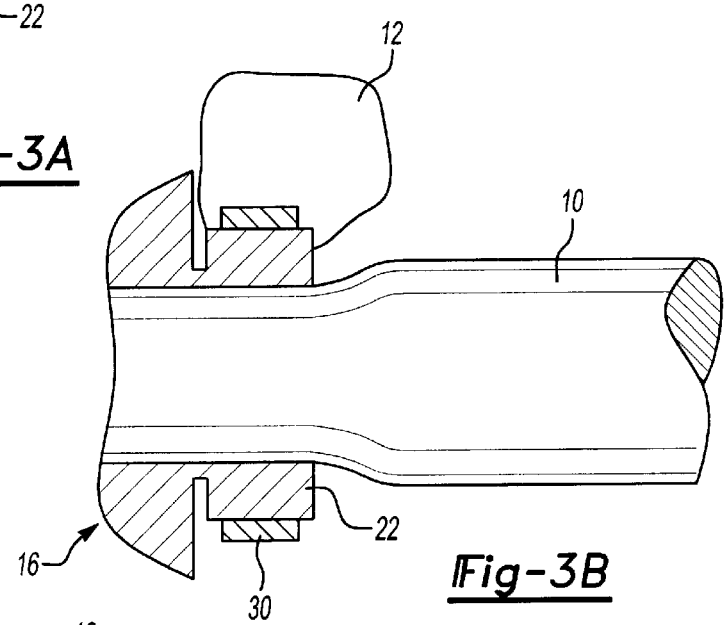
FIG. 3B is a side cross-sectional view of another stabilizer bar for use with the bushing assembly of the present invention.
Figure 3C:
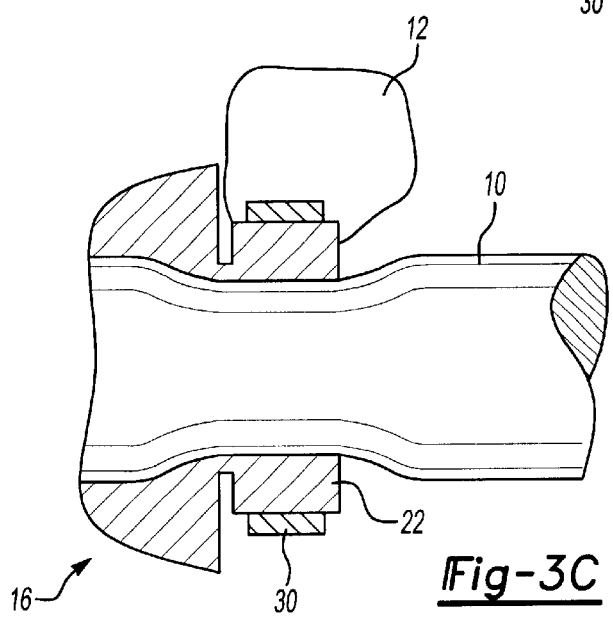
FIG. 3C is a side cross-sectional view of yet another stabilizer bar for use with the bushing assembly of the present invention.

Additional resistance can be achieved by utilizing deformed bar segments that force radial or lateral interference with portion 22. Referring to FIGS. 3A–3C, the stabilizer bar 10 may be further constrained against lateral movement relative to the frame 12 by features formed in the stabilizer bar 10. Under sufficiently high lateral forces, the clamping force of the clamp 30 may still permit lateral movement. Accordingly, the stabilizer bar may be plastically deformed adjacent to the second portion 22 to prevent the stabilizer bar 10 for moving laterally and give the clamp 30 a feature against which it may react. In FIG. 3A, the stabilizer bar 10 may be bent adjacent to the second portion 22. Alternatively, as shown in FIG. 3B the stabilizer 10 may taper outwardly such that a neck 34 is adjacent to the second portion 22. Additionally, the stabilizer bar 10 may have a narrow portion, shown in FIG. 3C, about which the second portion 22 is clamped. In these manners, the stabilizer bar 10 may provide additional constraint against lateral movement.

Accordingly, the above invention provides an improved stabilizer bushing assembly that reduces the number of components that must be individually installed onto the stabilizer bar while eliminating steel-to-steel contact. The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A bushing assembly for use with a stabilizer bar comprising:

a bushing having a hole there through along an axis for receiving the stabilizer bar, said bushing having a first portion and a second portion extending from said first portion along said axis with a tether portion connecting said first and second portions and a notch adjacent to said tether portion separating said first and second portions; and a clamp supported on said second portion for securing said second portion to the stabilizer bar to prevent relative rotation therebetween.

2. The assembly according to claim 1, wherein said bushing is unitarily constructed from an elastomeric material.

3. The assembly according to claim 1, wherein said tether portion forms a frangible connection for temporarily connecting said second portion to said first portion during installation of said bushing assembly to the stabilizer bar.

4. The assembly according to claim 1, wherein said second portion includes a lip extending radially therefrom spaced from said first portion to retain said clamp on said second portion.

5. The assembly according to claim 4, wherein said second portion tapers downwardly toward said lip.

6. The assembly according to claim 1, wherein said clamp is a metal ring for plastically deforming about said second portion to secure said second portion and clamp to the stabilizer bar.

7. The assembly according to claim 1, further including a slit through said first, second, and tether portions from an exterior surface to said hole for permitting installation of said bushing assembly onto the stabilizer bar.

8. The assembly according to claim 1, wherein said notch is cut between said first and second portions.

9. The assembly according to claim 1, wherein said tether portion is arcuate.

10. The assembly according to claim 9, wherein said tether portion is annular.

11. A suspension assembly for use in stabilizing a vehicle during turning maneuvers, said assembly comprising:

a frame;

a stabilizer bar secured to said frame by a bracket;

a bushing having a hole there through along an axis receiving the stabilizer bar, said bushing having a first portion disposed between said bracket and said stabilizer bar with said stabilizer bar supported by said first portion in a slip fit relationship, and a second portion extending from said first portion along said axis with a tether portion connecting said first and second portions and a notch adjacent to said tether portion separating said first and second portions; and a clamp supported on said second portion securing said second portion to the stabilizer bar to prevent relative rotation between said second portion and said stabilizer bar.

12. The assembly according to claim 11, wherein said bushing is unitarily constructed from an elastomeric material.

13. The assembly according to claim 11, wherein said tether portion forms a frangible connection for temporarily connecting said second portion to said first portion during installation of said bushing assembly to the stabilizer bar.

14. The assembly according to claim 11, wherein said second portion includes a lip extending radially therefrom spaced from said first portion to retain said clamp on said second portion.

15. The assembly according to claim 14, wherein said second portion tapers downwardly toward said lip.

16. The assembly according to claim 11, wherein said clamp is a metal ring for plastically deforming about said second portion to secure said second portion and clamp to the stabilizer bar.

17. The assembly according to claim 11, further including a slit through said first, second, and tether portions from an exterior surface to said hole for permitting installation of said bushing assembly onto the stabilizer bar.

18. The assembly according to claim 11, wherein said notch is cut between said first and second portions.

19. The assembly according to claim 11, wherein said tether portion is arcuate.

20. The assembly according to claim 19, wherein said tether portion is annular.

21. A method of installing a stabilizer bar onto a frame, comprising the steps of:

a) installing a bushing assembly onto the stabilizer bar;

b) securing the stabilizer bar to the frame with a bracket with the bracket arranged over a first portion of the bushing assembly; and c) clamping a second portion of the bushing assembly to the stabilizer bar to laterally locate the stabilizer bar relative to the frame, wherein the second portion extends from the first portion with a tether portion connecting the first and second portions.

22. The method according to claim 21, wherein a notch adjacent to the tether portion separating the first and second portions.

23. The method according to claim 21, wherein step c) includes plastically deforming a metal ring about the second portion.

24. A method of installing a stabilizer bar onto a frame, comprising the steps of a) installing a bushing assembly onto the stabilizer bar;
b) securing the stabilizer bar to the frame with a bracket with the bracket arranged over a first portion of the bushing assembly;
c) clamping a second portion of the bushing assembly to the stabilizer bar to laterally locale the stabilizer bar relative to the frame; and
d) tearing the second portion from the first portion to permit relative rotation therebetween.

* * * * *